United States Patent
Diao

(10) Patent No.: US 10,439,543 B2
(45) Date of Patent: Oct. 8, 2019

(54) PERMANENT MAGNET SPEED GOVERNOR HAVING FIXED MAGNETIC GAP

(71) Applicant: Junqi Diao, Huaiyin (CN)

(72) Inventor: Junqi Diao, Huaiyin (CN)

( * ) Notice: Subject to any disclaimer, the term of this patent is extended or adjusted under 35 U.S.C. 154(b) by 353 days.

(21) Appl. No.: 15/533,243

(22) PCT Filed: Jan. 15, 2015

(86) PCT No.: PCT/CN2015/070737
§ 371 (c)(1),
(2) Date: Jun. 5, 2017

(87) PCT Pub. No.: WO2016/086514
PCT Pub. Date: Jun. 9, 2016

(65) Prior Publication Data
US 2018/0013372 A1 Jan. 11, 2018

(30) Foreign Application Priority Data
Dec. 5, 2014 (CN) .......................... 2014 1 0730766

(51) Int. Cl.
*H02P 29/00* (2016.01)
*H02K 49/10* (2006.01)
*H02P 15/00* (2006.01)

(52) U.S. Cl.
CPC ....... *H02P 29/0027* (2013.01); *H02K 49/102* (2013.01); *H02K 49/106* (2013.01); *H02P 15/00* (2013.01); *H02K 2213/09* (2013.01)

(58) Field of Classification Search
CPC .. H02K 49/102; H02K 49/104; H02K 49/106; H02P 29/0027; H02P 29/0019; H02P 15/00
(Continued)

(56) References Cited

U.S. PATENT DOCUMENTS

| 10,312,790 | B2 * | 6/2019 | Mostovoy | H02K 7/11 |
| 2017/0222537 | A1 * | 8/2017 | Xu | H02K 1/223 |
| 2018/0138795 | A1 * | 5/2018 | Imanishi | H02K 49/043 |

FOREIGN PATENT DOCUMENTS

| CN | 201230271 Y | 4/2009 |
| CN | 103904863 A | 7/2014 |

(Continued)

OTHER PUBLICATIONS

Aug. 31, 2015 Search Report issued in International Patent Application No. PCT/CN2015/070737.

*Primary Examiner* — Jeremy A Luks
(74) *Attorney, Agent, or Firm* — Oliff PLC

(57) ABSTRACT

A permanent magnet speed governor having a fixed magnetic gap. The permanent magnet speed governor includes an outer magnetic rotor and an inner magnetic rotor, at least two outer permanent magnets being evenly distributed along the circumferential direction of the inner circumferential surface of the outer magnetic rotor, the magnetic poles of the outer permanent magnets being arranged along the radial direction, the magnetisms of exposed magnetic pole surfaces of two adjacent outer permanent magnets being different. At least one rotatable permanent magnet is distributed along the circumferential direction of the outer circumferential surface of the inner magnetic rotor, the rotatable permanent magnet being cylindrical and the N pole and the S pole being along the diametrical direction, one end of the rotatable permanent magnet being provided with a magnetic circuit regulator. It increases the engagement area of the speed governor.

13 Claims, 8 Drawing Sheets

(58) Field of Classification Search
USPC .............................................. 181/94–95, 103
See application file for complete search history.

(56) References Cited

FOREIGN PATENT DOCUMENTS

| CN | 203775006 U | 8/2014 |
| CN | 204205911 U | 3/2015 |

* cited by examiner

PERMANENT MAGNET SPEED GOVERNOR HAVING FIXED MAGNETIC GAP

TECHNICAL FIELD

The invention relates to a permanent magnet speed governor, specifically a permanent magnet speed governor having fixed magnetic gap.

BACKGROUND TECHNOLOGY

Permanent magnet speed governors realize speed regulation through the magnetic coupling of permanent magnet and realize the flexible (magnetic) connection of motors and loads, without any harmonic waves affecting power grid, with high reliability, and they can work in various severe environments such as high temperature, low temperature, humid environment, dirty environment, inflammable and explosive environment, unsteady voltage and thunder, greatly reducing mechanical vibration; they are widely used in power, iron and steel, metallurgy, petrochemical, papermaking, municipal engineering, ship, irrigation and mining industries. However, the existing commonly-used permanent magnet speed governors realize speed regulation through the adjustment of air gap, and the power consumption of magnetic circuit regulator is large, and there are shortcomings such as poor torque transmission capability, high difficulty in assembling and a waste of lots of rare earth resources.

CONTENT OF INVENTION

As for the aforesaid problems, the present invention provides a permanent magnet speed governor having a fixed magnetic gap which can reduce the power consumption of magnetic circuit regulator, improve the torque transmission capability, reduces the difficulty in assembling and save rare earth resources.

The existing permanent magnet speed governors controls the degree that the conductor rotor cuts the magnetic line of force and thus realize the adjustment of torque through changes in the air gap between the conductor rotor and permanent magnetic rotor, and that method has many shortcomings. Based on the principle of like poles repelling and opposite poles attracting, the present invention designs a new permanent magnet speed governor from the perspective of changing the forces between the outer magnetic rotor and the inner magnetic rotor, so as to achieve the purpose of changing the torque. Referring to the characteristics of the magnetic and non-magnetic conductive materials, the magnetic size displayed externally by permanent magnet are controlled by two kinds of materials, thus to change the forces between the outer and inner magnetic rotors, and achieve the purpose of changing the torque.

In order to solve the aforesaid problems, the present invention adopts the following technical solutions: a permanent magnet speed governor having fixed magnetic gap, comprising a outer magnetic rotor that is connected to driving shaft and a inner magnetic rotor that is connected to the driven shaft, at least two outer permanent magnets being evenly distributed along the circumferential direction of the inner circumferential surface of the said outer magnetic rotor, the magnetic poles of the said outer permanent magnets being arranged along the radial direction, the magnetisms of exposed magnetic pole surfaces of two adjacent outer permanent magnets being different; permanent magnets being evenly distributed along the circumferential direction of the inner circumferential surface of the said outer magnetic rotor and the said outer permanent magnets are N pole magnet or S pole magnet, the two magnets are interval setting; at least one rotatable permanent magnet is distributed along the circumferential direction of the outer circumferential surface of the said inner magnetic rotor, the said rotatable permanent magnet being cylindrical and the N pole and the S pole being along the diametrical direction, magnetic conductors are wrapped at the two sides of the rotatable permanent magnet, the two magnetic conductors are separated by a non-magnetic conductor; one end of the rotatable permanent magnet being provided with a magnetic circuit regulator, the said magnetic circuit regulator is used to rotate the rotatable permanent magnet, regulate its magnetic pole direction and thus change the magnetic intensity of magnetic conductors at both sides, change the force between the magnetic conductor and the outer permanent magnet. The setting of non-magnetic conductor hinders the development of short circuit formed by magnetic line of force inside the magnetic conductor, thus causing the magnetic conductor to show no magnetism externally no matter how rotate the rotatable permanent magnet. The change of the transmission force is realized by the change of the interaction force between the outer permanent magnet and the rotatable permanent magnet, so as to realize the speed regulating function. The specific adjustment process is as follows: the rotatable permanent magnet is rotated through the magnetic circuit regulator, and when the connection surface of N pole and S Pole of rotatable permanent magnet is perpendicular to (the included angle of 90°) the contact surface of magnetic conductor and non-magnetic conductor, the magnetic line of force is separated by the non-magnetic conductor and passes through the air, and the magnetic conductor is magnetized to the strong magnet of the corresponding magnetic pole, generates attraction or repulsion with the outer permanent magnet according to the principle of like poles repelling and opposite poles attracting, and then drive the inner magnetic rotor and outer magnetic rotor to rotate in the same direction or reverse direction; on the contrary, when the connection surface of N pole and S Pole of rotatable permanent magnet is parallel to (the included angle of 0°)the contact surface of magnetic conductor and non-magnetic conductor, the magnetic line of force successfully passes through the magnetic conductor, and the magnetic conductor displays no magnetism externally, the outer permanent magnet does not exert force on the magnetic conductor; according to different rotation angle of rotatable permanent magnet, affected by the change of magnetic circuit, the magnetism displayed externally by the magnetic conductor changes from the weakest to the strongest (or from the strongest to the weakest), that is the force of outer permanent magnet on magnetic conductor changes from the weakest to the strongest (or changes from the strongest to the weakest). In general, the driving shaft is connected with the main motor, and the driven shaft is connected with the load, but the two can be interchanged, that is, the driving shaft is connected with the load, and the driven shaft is connected with the main motor.

The magnet number of outer permanent magnet can be the same or different with the magnet pole number of rotatable permanent magnet, and the outer permanent magnets increase and decrease in pairs in accordance with the magnet (N pole and S pole of exposed magnetic pole surfaces).

When the magnet number of outer permanent magnet is equal to the magnetic pole number of rotatable permanent magnet, the speed control function of input and output speed of 0~100% can be realized; When the magnet number of outer permanent magnet is not equal to the magnetic pole number of rotatable permanent magnet, the speed control function of input and output speed of 0~N% can be realized (the torque made inverse proportional change with N and the maximum power unchanged).

In comparison with the change in the axial distance of the conductor rotor and the permanent magnet rotor, this method reduces the power consumption of magnetic circuit regulator, reduces the generation of heat and improves the torque transmission capability.

There are many installation directions for the rotatable permanent magnet, just make sure that the force between the outer permanent magnet and the rotatble permanent magnet is adjustable, the said rotatable permanent magnet is perpendicular to the driven shaft. The rotatable permanent magnet is distributed around the circumferential direction of driven shaft.

In order to improve the magnetism displayed externally by the inner magnetic rotor and increase the adjustment scope of magnetism, every rotatable permanent magnet is equipped with a fixed permanent magnet side by side along the axial direction of the driven shaft, the fixed permanent magnet is cylindrical and has an N pole and an S pole in the diameter direction, the magnetic conductor and the non-magnetic conductor around the rotatable permanent magnet extend to the surrounding of the fixed permanent magnet, and an N pole and an S pole of the fixed permanent magnet are respectively arranged in two separated magnetic conductors and the connection surface of those two poles is perpendicular to the contact surface of the magnetic conductor and the non-magnetic conductor. The specific adjustment process is as follows: the rotatable permanent magnet can be rotated through the magnetic circuit regulator, and when the same magnetic pole of rotatable permanent magnet is corresponding to the fixed permanent magnet, both ends of magnetic conductor will be magnetized to the strong magnet of the corresponding magnetic pole, and the magnetism is the strongest, being the sum of all magnetisms of two magnets; the magnetic conductor generates attraction or repulsion with the outer permanent magnet according to the principle of like poles repelling and opposite poles attracting, and then drive the inner magnetic rotor and outer magnetic rotor to rotate in the same direction or reverse direction; when the same poles of the fixed permanent magnet and the rotatable permanent magnet are in the opposite direction, the magnetic line of force successfully passes through the corresponding magnetic conductor, and the magnetic conductor does not display magnetism externally; the outer permanent magnet does not exert force on the magnetic conductor; when the magnetic pole of rotatable permanent magnet rotates to the extent of being parallel to the contact surface of the magnetic conductor and the non-magnetic conductor, the magnetic line of force of rotatable permanent magnet passes through the magnetic conductor and displays no magnetism externally, and there is only the magnetism of fixed permanent magnet; according to different rotation angle of rotatable permanent magnet, the magnetism displayed externally by the magnetic conductor changes from the strongest to the weakest (or from the weakest to the strongest), that is the force of outer permanent magnet on magnetic conductor changes from the weakest to the strongest (or changes from the strongest to the weakest).

Another preferable arrangement method of rotatable permanent magnet is as follows: the said rotatable permanent magnet is parallel to the driven shaft. The rotatable permanent magnet is circumferentially arranged around the driven shaft.

Similarly, in order to improve the magnetism displayed externally by the inner magnetic rotor and increase the adjustment scope of magnetism, every rotatable permanent magnet is equipped with a fixed permanent magnet side by side along the radial direction of the driven shaft, the fixed permanent magnet is cylindrical and has an N pole and an S pole in the diameter direction, and the magnetic conductor and the non-magnetic conductor around the rotatable permanent magnet extend to the surrounding of the fixed permanent magnet, and an N pole and an S pole of the fixed permanent magnet are respectively arranged in two separated magnetic conductors and the connection surface of those two poles is perpendicular to the contact surface of the magnetic conductor and the non-magnetic conductor. The specific adjustment process is the same as above.

The said magnetic circuit regulator comprises a regulating actuator used for receiving control signals and a mechanical transmission mechanism connecting the regulating actuator and the rotatable permanent magnet. During the use process, the permanent magnet speed governor is installed in a control system, and the pressure, flow, liquid level or other control signals are received and processed by the control system and are provided to the regulating actuator, and the regulating actuator rotates the rotatable permanent magnet through the mechanical transmission mechanism, changing the magnetic intensity, adjusting the rotating speed of loads and meeting the control requirements. The mechanical transmission mechanism is used to transmit the control act sent out by the regulating actuator to the rotatable permanent magnet, controlling the rotation of permanent magnet, and there are many realization methods, such as servo motor, lever transmission mechanism, gear transmission mechanism, gear-rack transmission mechanism and guide wire transmission mechanism. Several best feasible transmission mechanisms are described as follows:

The said mechanical transmission mechanism is a lever transmission mechanism, comprising a transmission sleeve, which is sheathed on the driven shaft and is in key connection with the driven shaft, and rotary rod correspondingly arranged for every rotatable permanent magnet, wherein one end of the transmission sleeve is provided with a limiting groove at one end, and one end of rotary rod is in fixed connection with the end of rotatable permanent magnet, while the other end of rotary rod is stuck in the limiting groove via the limiting shaft to connect the transmission sleeve, and the other end of transmission sleeve is connected with the regulating actuator through the bearing sheathed on the driven shaft.

The said mechanical transmission mechanism is a gear transmission mechanism, comprising a gear barrel sheathed on outside the driven shaft and a rotary gear which is in mesh connection with the periphery of gear barrel, wherein the rotary gear and the rotatable permanent magnet are one-to-one correspondence, and the shaft of rotary gear is connected with the end of rotatable permanent magnet, and the gear barrel is connected with the regulating actuator.

The said mechanical transmission mechanism is a gear-rack transmission mechanism, comprising a rack barrel connected with the regulating actuator, a rack inside the rack barrel and a rotary gear which is meshed with the rack, wherein the shaft of rotary gear is connected with the end of rotatable permanent magnet.

Due to adopting fixed magnetic gap structure, the present invention greatly improves the meshing area of speed governor and reduces the assembly difficulty, reduces the heat generation, increases the speed governing range, saves the rare earth materials, greatly improves the torque transmission capacity. Since the principle of magnetic transmission is adopted, the speed control function of input and output speed of 0~N% can be realized, the application scope and the magnetic field of the present invention is greatly expanded; since it adopts the magnetic circuit adjustment structure, the power consumption of a mechanism for executing adjustment is greatly reduced and the entire volume of the speed governor is reduced to the maximum extent, not only lowering consumption of materials and saving installation space, but convenience is brought to the site installation construction at the same time.

Figure 1:
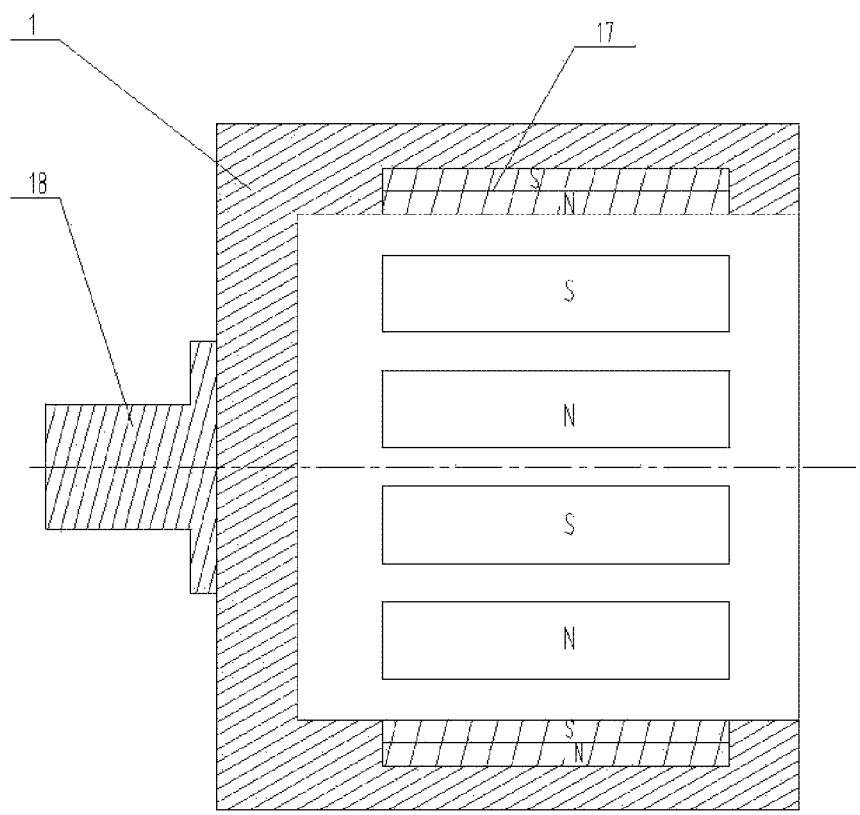
FIG. 1 is the section view of outer magnetic rotor of present invention.
Figure 2:
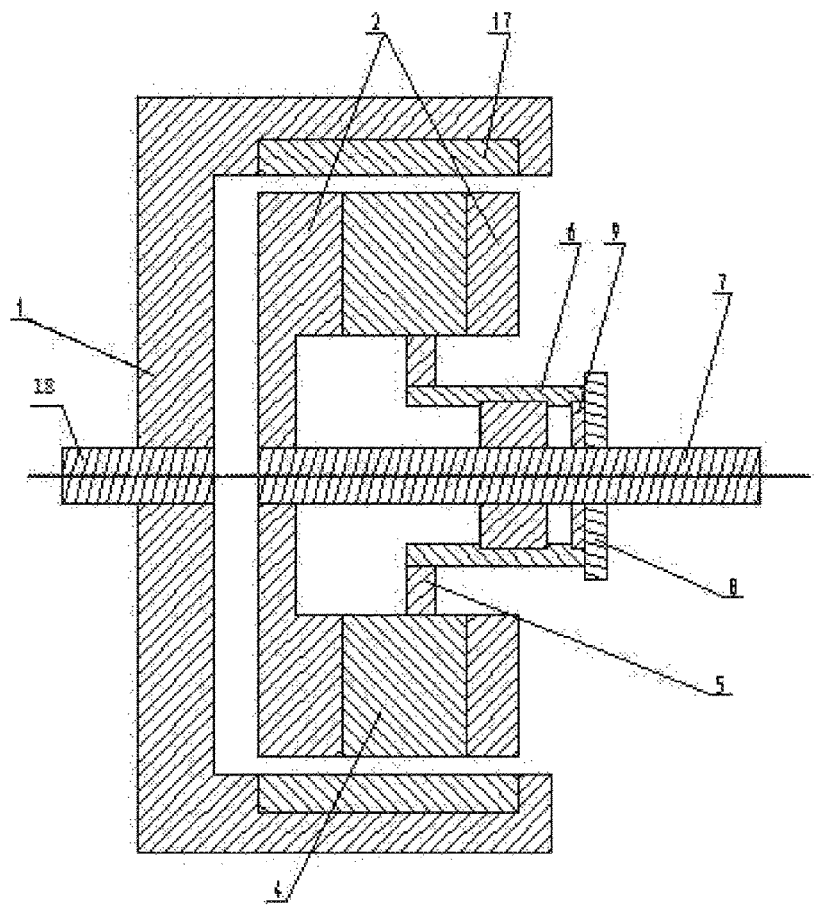
FIG. 2 is the front section view of Embodiment 1.
Figure 3:
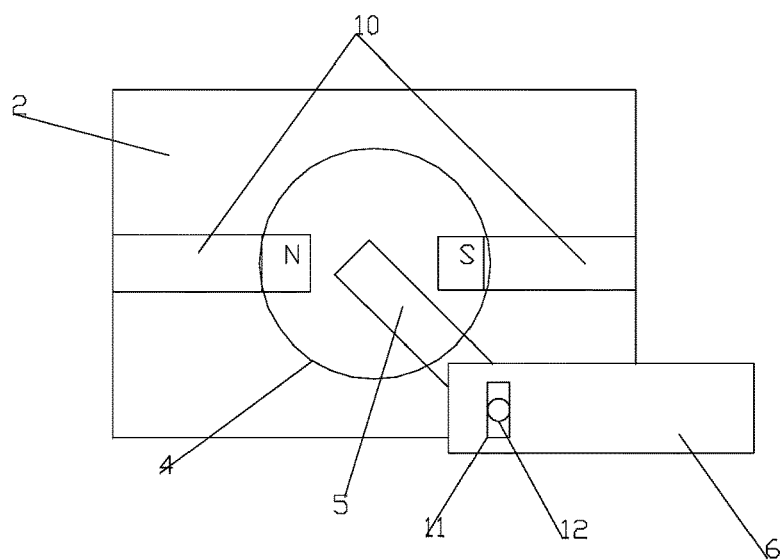
FIG. 3 is the schematic diagram of magnetic pole face of Embodiment 1.

Specific Embodiments
Embodiment 1
A permanent magnet speed governor having fixed magnetic gap, as shown in FIG. 1, FIG. 2 and FIG. 3, comprising a outer magnetic rotor 1 that is connected to driving shaft 18 and a inner magnetic rotor that is connected to the driven shaft 7, at least two outer permanent magnets 17 being evenly distributed along the circumferential direction of the inner circumferential surface of the said outer magnetic rotor 1, the magnetic poles of the said outer permanent magnets 17 being arranged along the radial direction, the magnetisms of exposed magnetic pole surfaces of two adjacent outer permanent magnets 17 being different; at least one rotatable permanent magnet 4 is distributed along the circumferential direction of the outer circumferential surface of the said inner magnetic rotor, the said rotatable permanent magnet 4 is perpendicular to the driven shaft 7. The said rotatable permanent magnet 4 being cylindrical and the N pole and the S pole being along the diametrical direction, magnetic conductors 2 are wrapped at the two sides of the rotatable permanent magnet 4, the two magnetic conductors 2 are separated by a non-magnetic conductor 10; in this embodiment, the magnet number of outer permanent magnet 17 is equal to the magnetic pole number of rotatable permanent magnet 4. One end of the rotatable permanent magnet 4 being provided with a magnetic circuit regulator, the said magnetic circuit regulator is used to rotate the rotatable permanent magnet 4, regulate its magnetic pole direction and thus change the magnetic intensity of magnetic conductors 2 at both sides, change the force between the magnetic conductor 2 and the outer permanent magnet 17. The said magnetic circuit regulator comprises a regulating actuator 8 used for receiving control signals and a mechanical transmission mechanism connecting the regulating actuator 8 and the rotatable permanent magnet 4. The said mechanical transmission mechanism is a lever transmission mechanism, comprising a transmission sleeve 6, which is sheathed on the driven shaft 7 and is in key connection with the driven shaft 7, and rotary rod 5 correspondingly arranged for every rotatable permanent magnet 4, wherein one end of the transmission sleeve 6 is provided with a limiting groove 11 at one end, and one end of rotary rod 5 is in fixed connection with the end of rotatable permanent magnet 4, while the other end of rotary rod 5 is stuck in the limiting groove 11 via the limiting shaft 12 to connect the transmission sleeve 6, and the other end of transmission sleeve 6 is connected with the regulating actuator 8 through the bearing 9 sheathed on the driven shaft 7.

Figure 4:
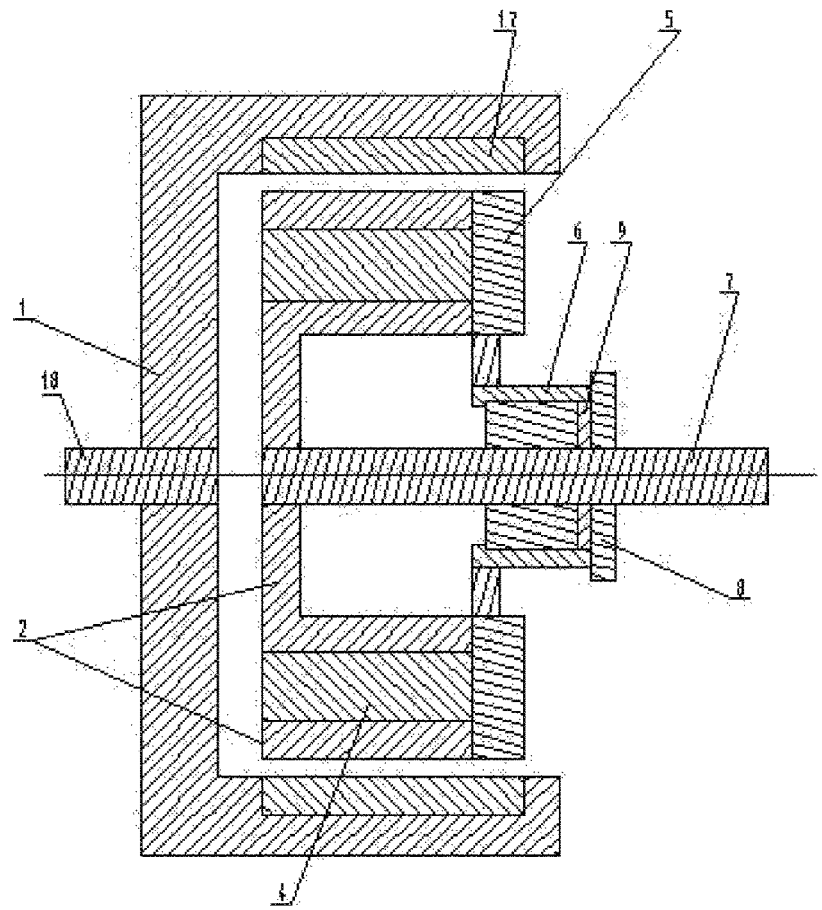
FIG. 4 is the front section view of Embodiment 2.
Figure 5:
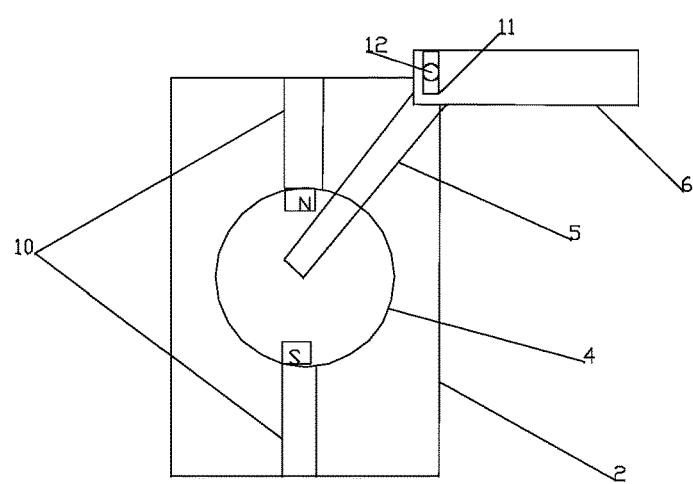
FIG. 5 is the schematic diagram of magnetic pole face of Embodiment 2.

Embodiment 2
A permanent magnet speed governor having a fixed magnetic gap, as shown in FIG. 1, FIG. 4 and FIG. 5, wherein the said rotatable permanent magnet 4 is parallel to the driven shaft 7, while other structures are the same as those of Embodiment 1.

Figure 6:
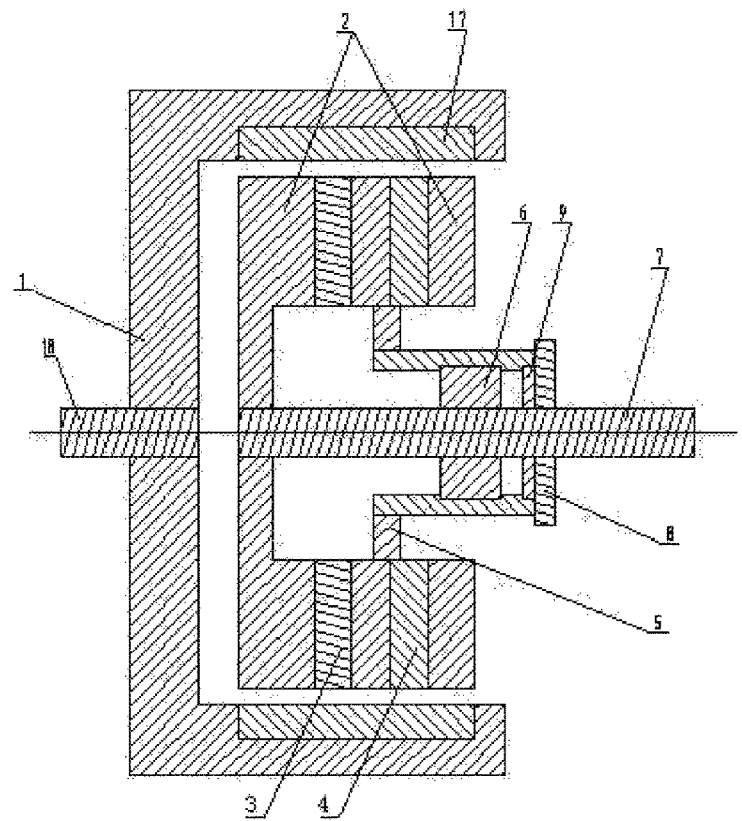
FIG. 6 is the front section view of Embodiment 3.
Figure 7:
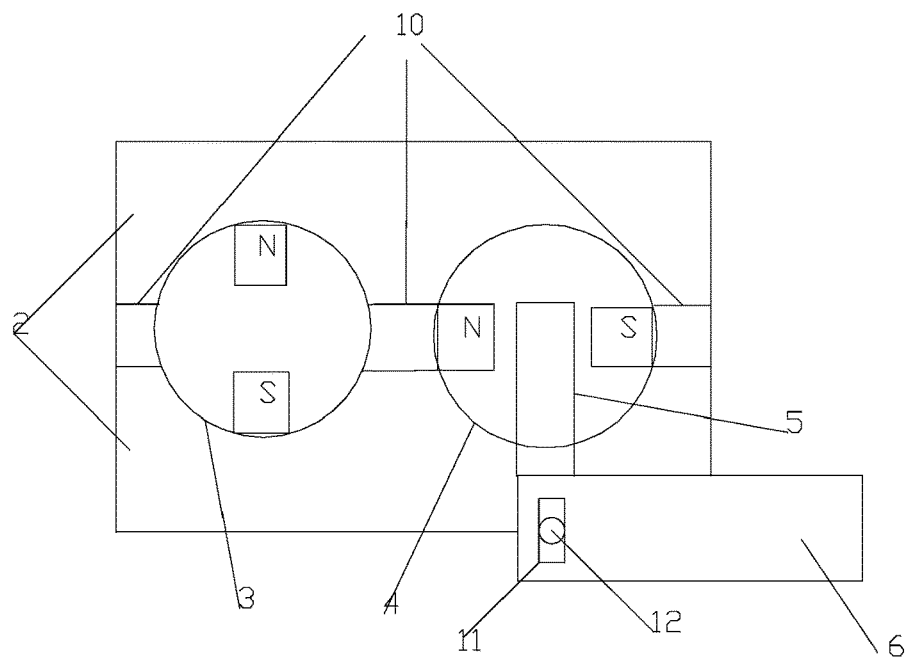
FIG. 7 is the schematic diagram of magnetic pole face of Embodiment 3.

Embodiment 3
A permanent magnet speed governor having fixed magnetic gap, as shown in FIG. 1, FIG. 6 and FIG. 7, comprising a outer magnetic rotor 1 that is connected to driving shaft 18 and a inner magnetic rotor that is connected to the driven shaft 7, at least two outer permanent magnets 17 being evenly distributed along the circumferential direction of the inner circumferential surface of the said outer magnetic rotor 1, the magnetic poles of the said outer permanent magnets 17 being arranged along the radial direction, the magnetisms of exposed magnetic pole surfaces of two adjacent outer permanent magnets 17 being different; at least one rotatable permanent magnet 4 is distributed along the circumferential direction of the outer circumferential surface of the said inner magnetic rotor, the said rotatable permanent magnet 4 is perpendicular to the driven shaft 7. The said rotatable permanent magnet 4 being cylindrical and the N pole and the S pole being along the diametrical direction, magnetic conductors 2 are wrapped at the two sides of the rotatable permanent magnet 4, the two magnetic conductors 2 are separated by a non-magnetic conductor 10; every rotatable permanent magnet 4 is equipped with a fixed permanent magnet 3 side by side along the axial direction of the driven shaft 7, the fixed permanent magnet 3 is cylindrical and has an N pole and an S pole in the diameter direction, the magnetic conductor 2 and the non-magnetic conductor 10 around the rotatable permanent magnet 4 extend to the surrounding of the fixed permanent magnet 3, and an N pole and an S pole of the fixed permanent magnet 3 are respectively arranged in two separated magnetic conductors 2 and the connection surface of those two poles is perpendicular to the contact surface of the magnetic conductor 2 and the non-magnetic conductor 10. In the present embodiment, the magnet number of outer permanent magnet 17 is equal to the magnetic pole number of the rotatable permanent magnet 4, and also is equal to the magnetic pole number of the fixed permanent magnet 3. One end of the rotatable permanent magnet 4 being provided with a magnetic circuit regulator, the said magnetic circuit regulator is used to rotate the rotatable permanent magnet 4, regulate its magnetic pole direction and thus change the magnetic intensity of magnetic conductors 2 at both sides, change the force between the magnetic conductor 2 and the outer permanent magnet 17. The said magnetic circuit regulator comprises a regulating actuator 8 used for receiving control signals and a mechanical transmission mechanism connecting the regulating actuator 8 and the rotatable permanent magnet 4. The said mechanical transmission mechanism is a lever transmission mechanism, comprising a transmission sleeve 6, which is sheathed on the driven shaft 7 and is in key connection with the driven shaft 7, and rotary rod 5 correspondingly arranged for every rotatable permanent magnet 4, wherein one end of the transmission sleeve 6 is provided with a limiting groove 11 at one end, and one end of rotary rod 5 is in fixed connection with the end of rotatable permanent magnet 4, while the other end of rotary rod 5 is stuck in the limiting groove 11 via the limiting shaft 12 to connect the transmission sleeve 6, and the other end of transmission sleeve 6 is connected with the regulating actuator 8 through the bearing 9 sheathed on the driven shaft 7.

Embodiment 4

Figure 8:
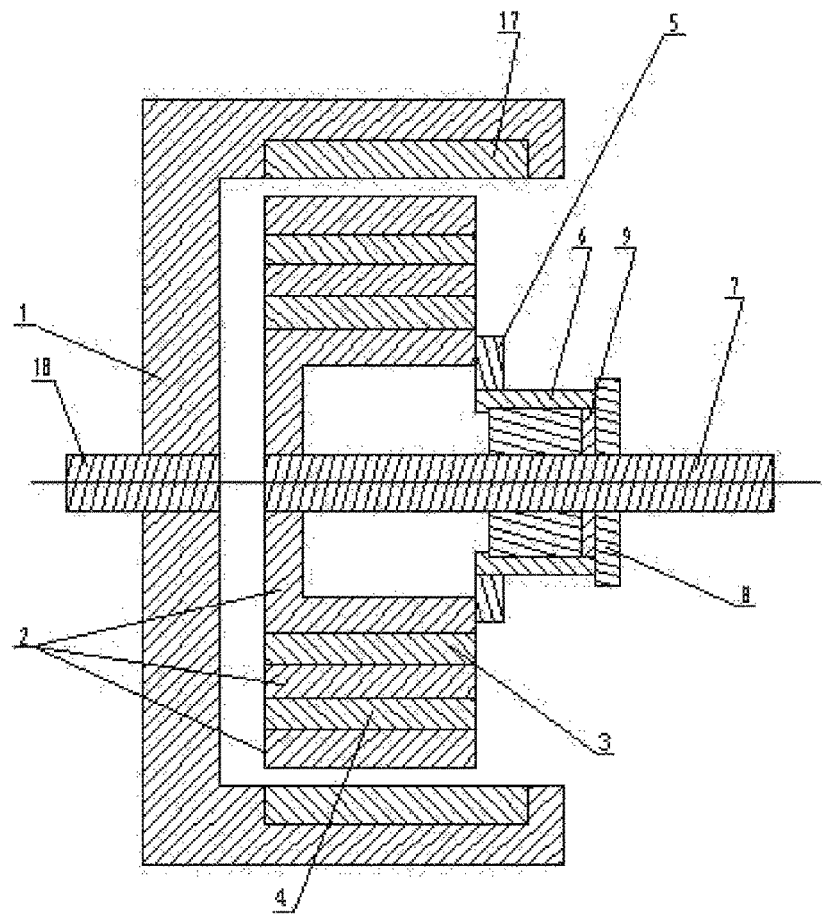
FIG. 8 is the front section view of Embodiment 4.
Figure 9:
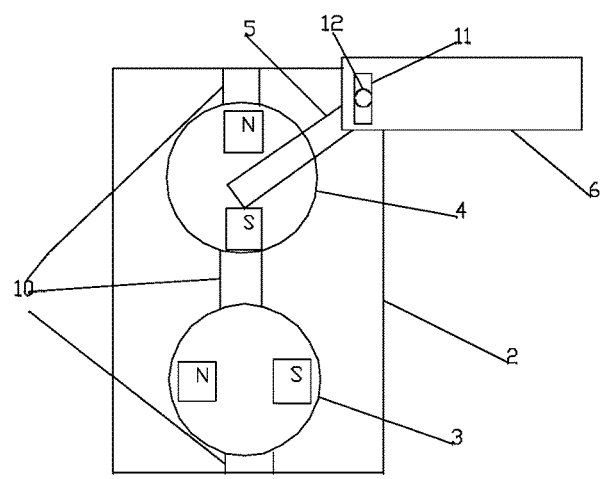
FIG. 9 is the schematic diagram of magnetic pole face of Embodiment 4.

A permanent magnet speed governor having a fixed magnetic gap, as shown in FIG. 1, FIG. 8 and FIG. 9, wherein the said rotatable permanent magnet 4 is parallel to the driven shaft 7, and every rotatable permanent magnet 4 is equipped with a fixed permanent magnet 3 side by side along the radial direction of the driven shaft 7, while other structures are the same as those of Embodiment 3.

Embodiment 5

Figure 10:
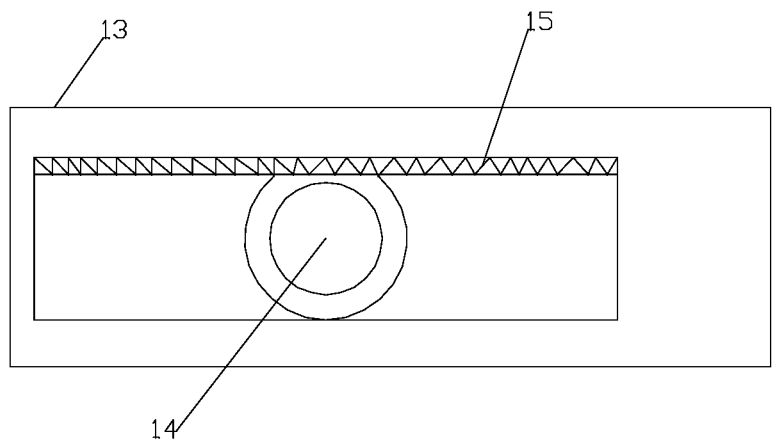
FIG. 10 is the schematic diagram of gear-rack transmission structure.

A permanent magnet speed governor having a fixed magnetic gap, as shown in FIG. 10, wherein the said mechanical transmission mechanism is a gear-rack transmission mechanism, comprising a rack barrel 13 connected with the regulating actuator 8, a rack 15 inside the rack barrel 13 and a rotary gear 14 which is meshed with the rack 15, wherein the shaft of rotary gear 14 is connected with the end of rotatable permanent magnet 4. Other structures are the same as those of Embodiment 3.

Embodiment 6

Figure 11:
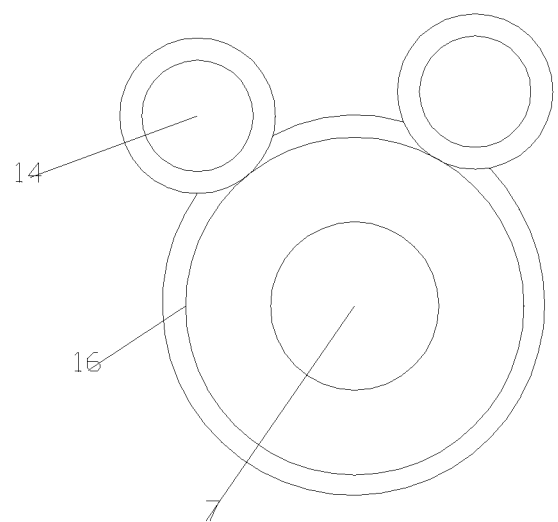
FIG. 11 is the schematic diagram of gear transmission structure.

A permanent magnet speed governor having a fixed magnetic gap, as shown in FIG. 11, wherein the said mechanical transmission mechanism is a gear transmission mechanism, comprising a gear barrel 16 sheathed on outside the driven shaft 7 and a rotary gear 14 which is in mesh connection with the periphery of gear barrel 16, wherein the rotary gear 14 and the rotatable permanent magnet 4 are one-to-one correspondence, and the shaft of rotary gear 14 is connected with the end of rotatable permanent magnet 4, and the gear barrel 16 is connected with the regulating actuator 8. Other structures are the same as those of Embodiment 4.

Embodiment 7

Figure 12:
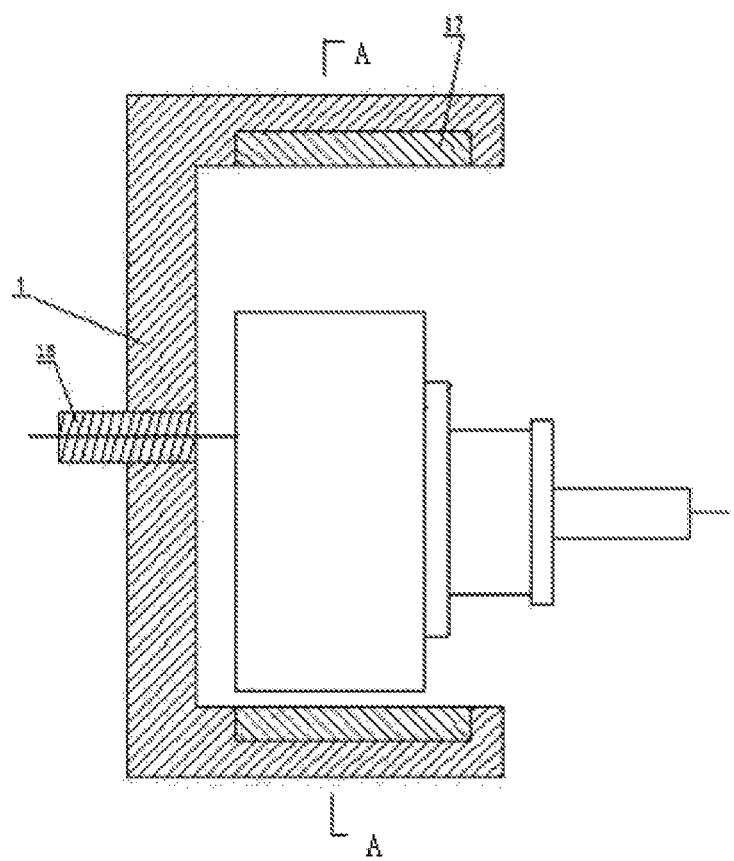
FIG. 12 is the front section view of Embodiment 7.
Figure 13:
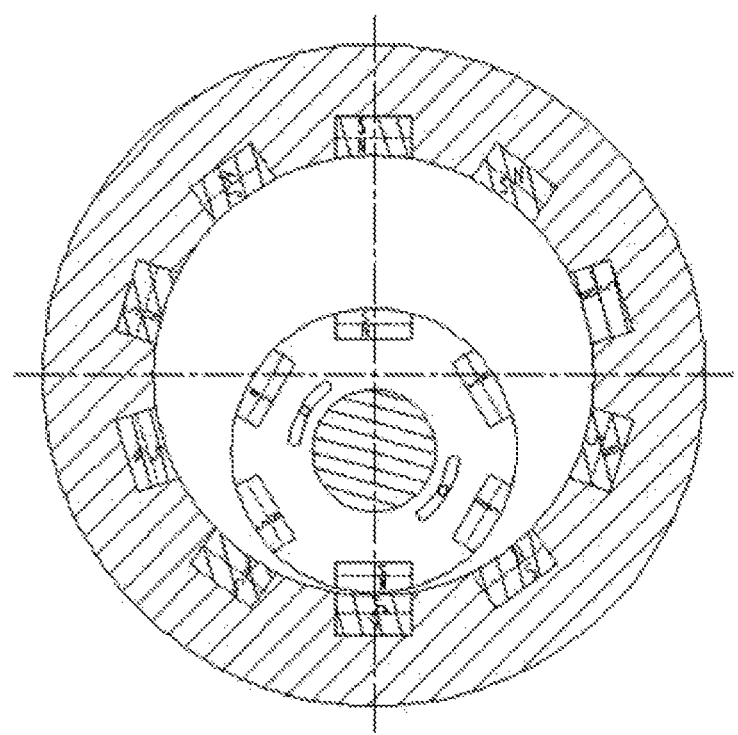
FIG. 13 is the A-A section view of Embodiment 7.
Wherein, 1. Outer magnetic rotor, 2. Magnetic conductor, 3. Fixed permanent magnet, 4. Rotatable permanent magnet, 5. Rotary rod, 6. Transmission sleeve, 7. Driven shaft, 8. Regulating actuator, 9. Bearing, 10. Non-magnetic conductor, 11. Limiting groove, 12. Limiting shaft, 13. Rack barrel, 14. Rotary gear, 15. Rack, 16. Gear barrel, 17. Outer permanent magnet, 18. Driving shaft.

A permanent magnet speed governor having fixed magnetic gap, as shown in FIG. 1, FIG. 12 and FIG. 13, in this embodiment, the magnet number of outer permanent magnet is not equal to the magnetic pole number of the rotatable permanent magnet and the fixed permanent magnet. Other structures are the same as those of Embodiment 3.

The present invention can adopt the structure comprising fixed permanent magnets and rotatable permanent magnets in pairs, or the structure comprising rotatable permanent magnets only, and it is not limited to the said Embodiments. Any invention adopting the same thought is under the protection scope of the present invention.

The invention claimed is:

1. A permanent magnet speed governor having fixed magnetic gap, comprising an outer magnetic rotor that is connected to a driving shaft and an inner magnetic rotor that is connected to a driven shaft, at least two outer permanent magnets being evenly distributed along the circumferential direction of the inner circumferential surface of the outer magnetic rotor, magnetic poles of the outer permanent magnets being arranged along the radial direction, the magnetisms of exposed magnetic pole surfaces of two adjacent outer permanent magnets being different; at least one rotatable permanent magnet is distributed along the circumferential direction of the outer circumferential surface of the inner magnetic rotor, the rotatable permanent magnet being cylindrical and an N pole and an S pole being along the diametrical direction, magnetic conductors are wrapped at the two sides of the rotatable permanent magnet, the two magnetic conductors are separated by a non-magnetic conductor; one end of the rotatable permanent magnet being provided with a magnetic circuit regulator, the magnetic circuit regulator is used to rotate the rotatable permanent magnet, regulate its magnetic pole direction and thus change the magnetic intensity of magnetic conductors at both sides, change the force between the magnetic conductor and the outer permanent magnet.

2. The permanent magnet speed governor having a fixed magnetic gap according to claim 1, wherein the rotatable permanent magnet is perpendicular to the driven shaft.

3. The permanent magnet speed governor having a fixed magnetic gap according to claim 2, wherein every rotatable permanent magnet is equipped with a fixed permanent magnet side by side along the axial direction of the driven shaft, the fixed permanent magnet is cylindrical and has an N pole and an S pole in the diameter direction, the magnetic conductor and the non-magnetic conductor around the rotatable permanent magnet extend to the surrounding of the fixed permanent magnet, and an N pole and an S pole of the fixed permanent magnet are respectively arranged in two separated magnetic conductors and the connection surface of those two poles is perpendicular to the contact surface of the magnetic conductor and the non-magnetic conductor.

4. The permanent magnet speed governor having a fixed magnetic gap according to claim 1, wherein the rotatable permanent magnet is parallel to the driven shaft.

5. The permanent magnet speed governor having a fixed magnetic gap according to claim 4, wherein every rotatable permanent magnet is equipped with a fixed permanent magnet side by side along the radial direction of the driven shaft, the fixed permanent magnet is cylindrical and has an N pole and an S pole in the diameter direction, the magnetic conductor and the non-magnetic conductor around the rotatable permanent magnet extend to the surrounding of the fixed permanent magnet, and an N pole and an S pole of the fixed permanent magnet are respectively arranged in two separated magnetic conductors and the connection surface of those two poles is perpendicular to the contact surface of the magnetic conductor and the non-magnetic conductor.

6. The permanent magnet speed governor having a fixed magnetic gap according to claim 1, wherein the magnetic circuit regulator comprises a regulating actuator used for receiving control signals and a mechanical transmission mechanism connecting the regulating actuator and the rotatable permanent magnet.

7. The permanent magnet speed governor having a fixed magnetic gap according to claim 6, wherein the mechanical transmission mechanism is a lever transmission mechanism, comprising a transmission sleeve, which is sheathed on the driven shaft and is in key connection with the driven shaft, and rotary rod correspondingly arranged for every rotatable permanent magnet, wherein one end of the transmission sleeve is provided with a limiting groove at one end, and one end of rotary rod is in fixed connection with the end of rotatable permanent magnet, while the other end of rotary rod is stuck in the limiting groove via the limiting shaft to connect the transmission sleeve, and the other end of transmission sleeve is connected with the regulating actuator through the bearing sheathed on the driven shaft.

8. The permanent magnet speed governor having a fixed magnetic gap according to claim 6, wherein the mechanical transmission mechanism is a gear transmission mechanism, comprising a gear barrel sheathed on outside the driven shaft and a rotary gear which is in mesh connection with the periphery of gear barrel, wherein the rotary gear and the rotatable permanent magnet are one-to-one correspondence, and the shaft of rotary gear is connected with the end of rotatable permanent magnet, and the gear barrel is connected with the regulating actuator.

9. The permanent magnet speed governor having a fixed magnetic gap according to claim 6, wherein the mechanical transmission mechanism is a gear-rack transmission mechanism, comprising a rack barrel connected with the regulating actuator, a rack inside the rack barrel and a rotary gear which is meshed with the rack, wherein the shaft of rotary gear is connected with the end of rotatable permanent magnet.

10. The permanent magnet speed governor having a fixed magnetic gap according to claim 2, wherein the magnetic circuit regulator comprises a regulating actuator used for receiving control signals and a mechanical transmission mechanism connecting the regulating actuator and the rotatable permanent magnet.

11. The permanent magnet speed governor having a fixed magnetic gap according to claim 3, wherein the magnetic circuit regulator comprises a regulating actuator used for receiving control signals and a mechanical transmission mechanism connecting the regulating actuator and the rotatable permanent magnet.

12. The permanent magnet speed governor having a fixed magnetic gap according to claim 4, wherein the magnetic circuit regulator comprises a regulating actuator used for receiving control signals and a mechanical transmission mechanism connecting the regulating actuator and the rotatable permanent magnet.

13. The permanent magnet speed governor having a fixed magnetic gap according to claim 5, wherein the magnetic circuit regulator comprises a regulating actuator used for receiving control signals and a mechanical transmission mechanism connecting the regulating actuator and the rotatable permanent magnet.

* * * * *